(12) United States Patent
Berry

(10) Patent No.: US 7,600,248 B1
(45) Date of Patent: Oct. 6, 2009

(54) CHANNEL IDENTIFICATION FOR DIGITAL BROADCASTS IN PASSENGER ENTERTAINMENT SYSTEMS

(75) Inventor: Marilee G. Berry, Laverne, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/578,567

(22) Filed: May 25, 2000

(51) Int. Cl.
H04N 7/18 (2006.01)

(52) U.S. Cl. .......................... 725/77; 725/76

(58) Field of Classification Search .............. 725/74–77
See application file for complete search history.

(56) References Cited

U.S. PATENT DOCUMENTS

| | | | | |
|---|---|---|---|---|
| 5,289,272 A | * | 2/1994 | Rabowsky et al. | 725/76 |
| 5,666,151 A | * | 9/1997 | Kondo et al. | 725/147 |
| 5,760,819 A | * | 6/1998 | Sklar et al. | 725/76 |
| 5,835,127 A | * | 11/1998 | Booth et al. | 725/76 |
| 5,929,895 A | * | 7/1999 | Berry et al. | 725/77 |
| 5,973,722 A | * | 10/1999 | Wakai et al. | 725/76 |
| 6,014,381 A | * | 1/2000 | Troxel et al. | 370/395.52 |
| 6,058,288 A | * | 5/2000 | Reed et al. | 455/3.06 |
| 6,249,913 B1 | * | 6/2001 | Galipeau et al. | 725/76 |
| 6,378,130 B1 | * | 4/2002 | Adams | 725/95 |
| 6,499,027 B1 | * | 12/2002 | Weinberger | 707/4 |
| 6,598,227 B1 | * | 7/2003 | Berry et al. | 725/77 |
| 6,748,597 B1 | * | 6/2004 | Frisco et al. | 725/76 |
| 6,813,777 B1 | * | 11/2004 | Weinberger et al. | 725/76 |

* cited by examiner

Primary Examiner—John W Miller
Assistant Examiner—Chris Parry
(74) Attorney, Agent, or Firm—Daniel M. Barbieri

(57) ABSTRACT

A passenger entertainment system having video-on-demand, audio-on-demand, near video-on-demand, and digital and audio broadcast capabilities delivers multiple programming signals to the passenger seats. The system allocates an RF channel and one of multiple streams in that RF channel to a particular program channel so that channel surfing may be available to the passengers even when multiple programming signals are delivered on a single RF channel.

20 Claims, 10 Drawing Sheets

| UPCU CHANNEL | PCU CHANNEL | RF CHANNEL | STREAM | CONTENT | SOURCE | LANG 1 SLICE | LANG 2 SLICE | USAGE |
|---|---|---|---|---|---|---|---|---|
| MAP | MP OR 01 | 1 | N/A | MOVING MAP | AIRSHOW | 1 | 2 | CONTINUOUS |
| VIEW | VW OR 02 | 2 | N/A | OUTSIDE VIEW | CAMERA | N/A | N/A | CONTINUOUS |
| [NONE] | [NONE] | 4 | N/A | HIGH SPEED DOWNLOAD | CFS | | | |
| SA | SA OR 03 | ONE FROM 3, 5-10 | N/A | SAFETY VIDEO | 1 VR (e.g. SVHS OR TEAC) | 3 | 4 | VIDEO ANNOUNCEMENT |
| M03 | 04 | ONE FROM 3, 5-10 | N/A | MONTHLY MAGAZINE | 1 VR (e.g. SVHS OR TEAC) | 5 | 6 | CONTINUOUS |
| M04-M08 | 05 - 09 | ONE FROM 3, 5-10 | N/A | FEATURE FILM #1-5 BROADCASTS | 5 VRs (e.g. 2 TEAC TRIPLES) AND/OR UP TO 3 RE-ROUTED DIGITAL SOURCES TO THE VCC SCCs | 7,9,11,...17 | 8,10,12,...18 | CONTINUOUS |
| M09-M23 | 10 - 24 | 11 | 1 - 15 | FEATURE FILMS #7-21 BROADCAST | MFS1 (30 HR) | N/A | N/A | CONTINUOUS |
| M24 | 25 | 12 | 1 - 12 | FEATURE FILM #22 NVOD | MFS1 (31-32 HR) | N/A | N/A | AT 10-MINUTE INTERVALS, A 120-MINUTE MOVIE GETS FULL LOOPING COVERAGE W/12 STREAMS |
| M25 | 26 | 13 | 1 - 12 | FEATURE FILM #23 NVOD | MFS1 (33-34 HR) | N/A | N/A | (DITTO) |
| VOD | DV OR 27 | 14 - 16 | 1-15 PER CHANNEL | 45 VOD SIMULCASTS OF FILMS #24-43 | MFS2 (40 HR) | N/A | N/A | THE CONTENT IS USER-SELECTABLE FROM AMONG 20 2-HR. MOVIES |
| VOD | DV OR 27 | 17 - 19 | 1-15 PER CHANNEL | 45 VOD SIMULCASTS OF FILMS #44-63 | MFS3 (40 HR) | N/A | N/A | THE CONTENT IS USER-SELECTABLE FROM AMONG 20 2-HR. MOVIES |
| VOD | DV OR 27 | 20 - 22 | 1-15 PER CHANNEL | 45 VOD SIMULCASTS OF FILMS #64-83 | MFS4 (40 HR) | N/A | N/A | THE CONTENT IS USER-SELECTABLE FROM AMONG 20 2-HR. MOVIES |
| AOD | DA OR 28 | 23 - 24 | 1-15 PER CHANNEL | 45 AOD SIMULCASTS | MFS5 (500 HR) | N/A | N/A | THE CONTENT IS USER-SELECTABLE FROM AMONG 500 1-HR. PROGRAMS |
| A01-A70 | 29 - 98 | N/A | N/A | AUDIO | PRAM, ETC. | 19, 21, 23,...87 | 20, 22, 24,...88 | CONTINUOUS |

FIG. 6

CHANNEL IDENTIFICATION FOR DIGITAL BROADCASTS IN PASSENGER ENTERTAINMENT SYSTEMS

BACKGROUND OF THE INVENTION

1. Field of the Invention

The invention relates generally to a passenger entertainment system and, more particularly, to a system and method for identifying program selections in a passenger entertainment system that provides video-on-demand, audio-on-demand, near video-on-demand, and digital audio and video broadcasts.

2. Description of the Related Art

FIG. 1 illustrates selected components of a conventional passenger entertainment system, e.g., an in-flight entertainment (IFE) system, that employs a radio frequency (RF) cable 10 to deliver programming signals to the passenger seats 20. To deliver multiple programming signals to the passengers and thereby provide the passengers with programming choices, a video modulator 30 is used. In a typical arrangement, the video modulator 30 is connected to multiple video cassette players 31, 32, 33 that generate a plurality of different NTSC video streams and to a plurality of other inputs (not shown). The video modulator 30 receives the NTSC video stream inputs and the other inputs and modulates each input into a frequency band corresponding to one of multiple RF channels.

The passenger seats 20 are each equipped with a seat controller card (SCC) 40 that is tunable to the frequency bands corresponding to the multiple RF channels. The tuning of the SCC is carried out based on inputs from a passenger control unit (PCU) 50 that is provided for each passenger seat and operated by the passenger seated therein. For example, in a passenger entertainment system having 24 RF channels, the PCU 50 may be operated to tune the SCC to one of twenty-four (24) different RF channels. Once the SCC is tuned to receive from the RF channel selected by the passenger, it demodulates the RF signal passed therethrough and sends it to a seat display unit (SDU) 60 for viewing.

When the passenger wants to find out what programming selections are available to him or her, the passenger may either channel surf, i.e., toggle between the channels or change the channels up or down sequentially until he or she finds a program of interest, or refer to a hardcopy of an entertainment guide provided by the airline and directly switch to the channel corresponding to the program of interest using a numeric keypad provided on the PCU 50. In either case, the selected channel number is the same as the RF channel number carrying the program signal (i.e., there is an equally-distributive relationship between RF channels and the programming channels, such as a one-to-one correspondence between the RF channels and programming channels) and that RF channel number is displayed to the passenger on the PCU 50 and/or the SDU 60 to identify or indicate to the passenger the channel number that he or she has selected. In certain cases, the channel identification in the above manner is possible, because only one programming signal or stream is carried on a single RF channel. In other cases, the channel identification is possible because the programming channels are equally distributed across each of the RF channels, such as in a one-to-four, one-to-six, or one-to-fifteen correspondence between the RF channels and the programming channels.

However, when multiple programming signals are carried on a single RF channel and the programming channels are not equally distributed among the RF channels, the intuitive relationship between the RF channels and the programming channels breaks down and the conventional way(s) of identifying the program channels is no longer adequate.

SUMMARY OF THE INVENTION

The invention provides a system and method of identifying program channel selections in a passenger entertainment system that delivers multiple programming signals to the passenger seats on a single RF channel.

The invention also provides a system and method of transmitting programming signals and program information to the passenger seats, wherein channel surfing may be available to the passengers even when multiple programming signals are delivered on a single RF channel.

The invention further provides a system and method of allocating an RF channel and one of multiple streams in that RF channel to a particular program channel in a passenger entertainment system that provides video-on-demand, audio-on-demand, near video-on-demand, and digital audio and video broadcasts.

Additional objects, features and advantages of the invention will be set forth in the description of preferred embodiments which follows.

BRIEF DESCRIPTION OF THE DRAWINGS

The invention is described in detail herein with reference to the drawings in which:

FIG. 6 is a table identifying program channels that are logically assigned according to the invention and their correlation to the RF channels;

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
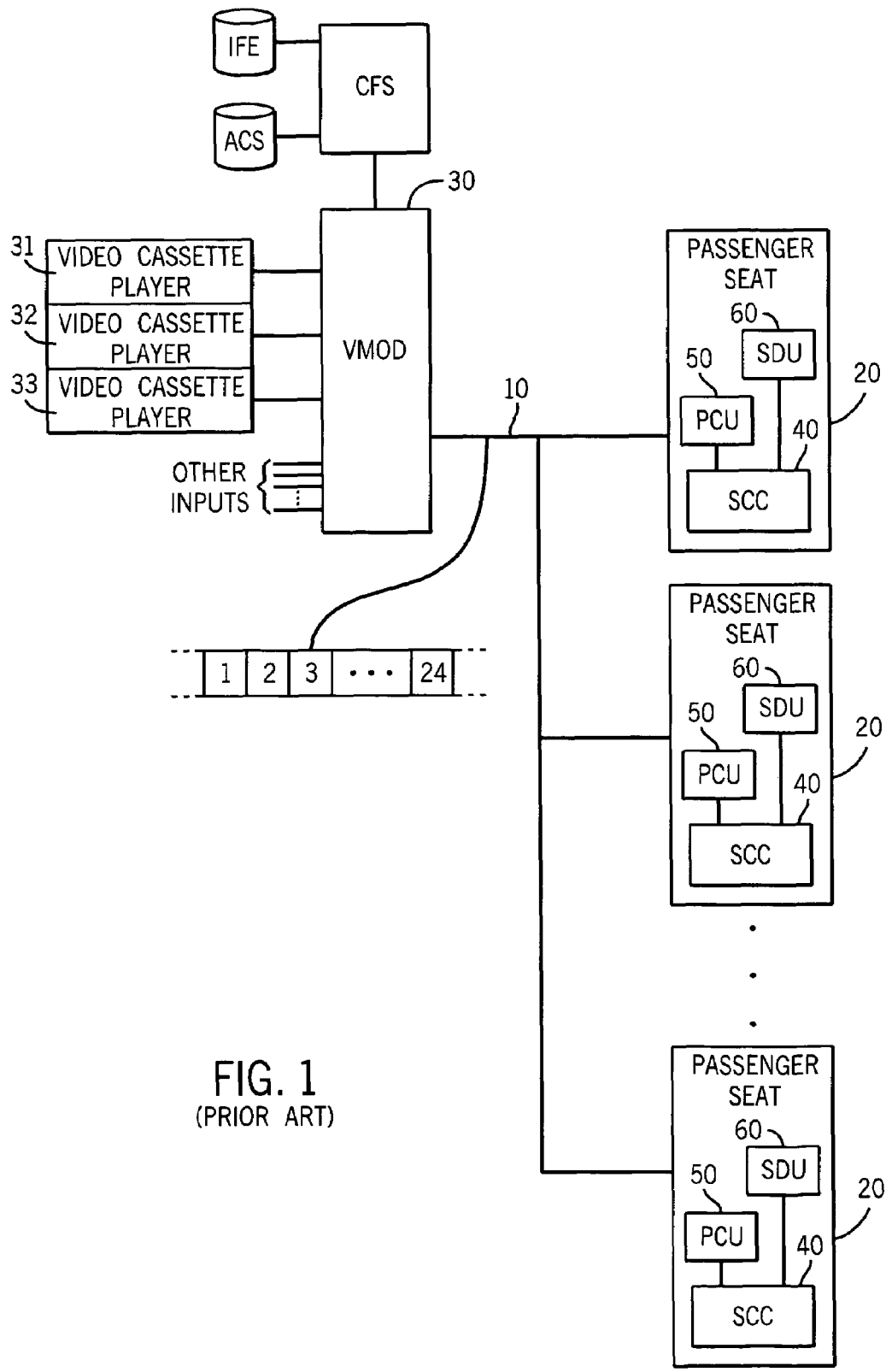
FIG. 1 illustrates selected components of a conventional passenger entertainment system that employs an RF cable to deliver programming signals to the passenger seats.
Figure 2:
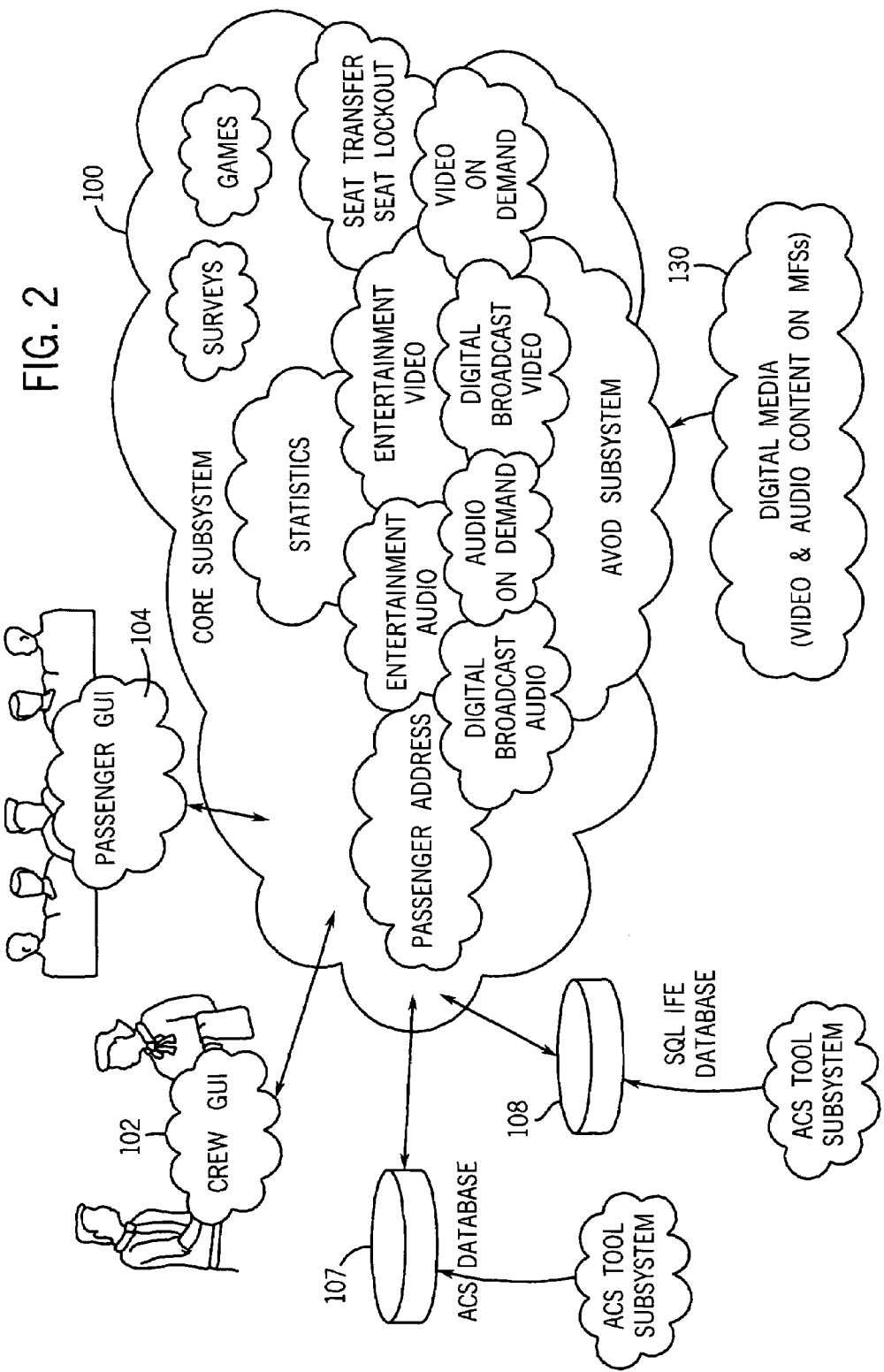
FIG. 2 conceptually illustrates a passenger entertainment system according to the invention.

FIG. 2 conceptually depicts the passenger entertainment system according to an embodiment of the invention. A passenger entertainment system for an aircraft or more concisely, an in-flight entertainment (IFE) system, is depicted here and all of the other figures. However, it is understood that the passenger entertainment system according to the invention may be implemented in any vehicle including buses, boats, trains, and jetfoils. Also, a description of some of the details of the passenger entertainment system has been omitted for clarity, and such details may be found in co-pending U.S. patent application Ser. No. 09/085,180, filed May 26, 1998, entitled "Passenger Entertainment System, Method, and Article of Manufacture Having Improved Area Distribution Equipment," the contents of which are incorporated by reference herein.

FIG. 2 shows a core subsystem 100 that is controlled by the aircraft crew through a graphic user interface (GUI) 102 to provide the following functionalities to the passengers: passenger address, audio and video entertainment, seat transfer and lockout, games, and surveys. The audio and video entertainment selections are made by the passengers using a passenger graphic user interface (GUI) 104. Statistics on the passenger selections are collected and stored for future analysis.

The audio and video entertainment includes analog broadcast of audio and video, digital broadcast of audio and video, video-on-demand, audio-on-demand, and near video-on-demand. The digital broadcast function permits multiple digital programs to be broadcast to the passenger seats over several program channels according to a predetermined schedule. The near video-on-demand function permits the same digital program to be broadcast in several successive showings, each started in staggered, regular time intervals. The video-on-demand or audio-on-demand function provides the passengers the ability to select a video or audio presentation and to start, pause, jump forward through, or jump backward through the selected video or audio presentation at any time.

The passenger entertainment system of FIG. 2 further comprises various storage units including a digital media storage unit 130, also known as a media file server (MFS), an aircraft configuration system (ACS) database 107, and an in-flight entertainment (IFE) database 108. The digital media storage unit 130 stores the digital audio and video programs including their set-up and other program information. The ACS database 107 stores data on the hardware configuration of the aircraft, including the number of digital media storage units, the number of video cassette players, the number of RF channels, and others. The IFE database 108 is a storage unit for the system controller for the passenger entertainment system, known as a cabin file server (CFS) (see FIG. 3). The CFS reads out the program information describing the digital audio and video programs from the digital media storage unit 130 and the aircraft configuration data from the ACS database 107, and generates an entertainment database (digital programming database) that describes the program channel assignment for each passenger seat on the aircraft. The entertainment database is stored in the IFE database 108 and transmitted to the SCC of each passenger seat for storage thereat.

Figure 3:
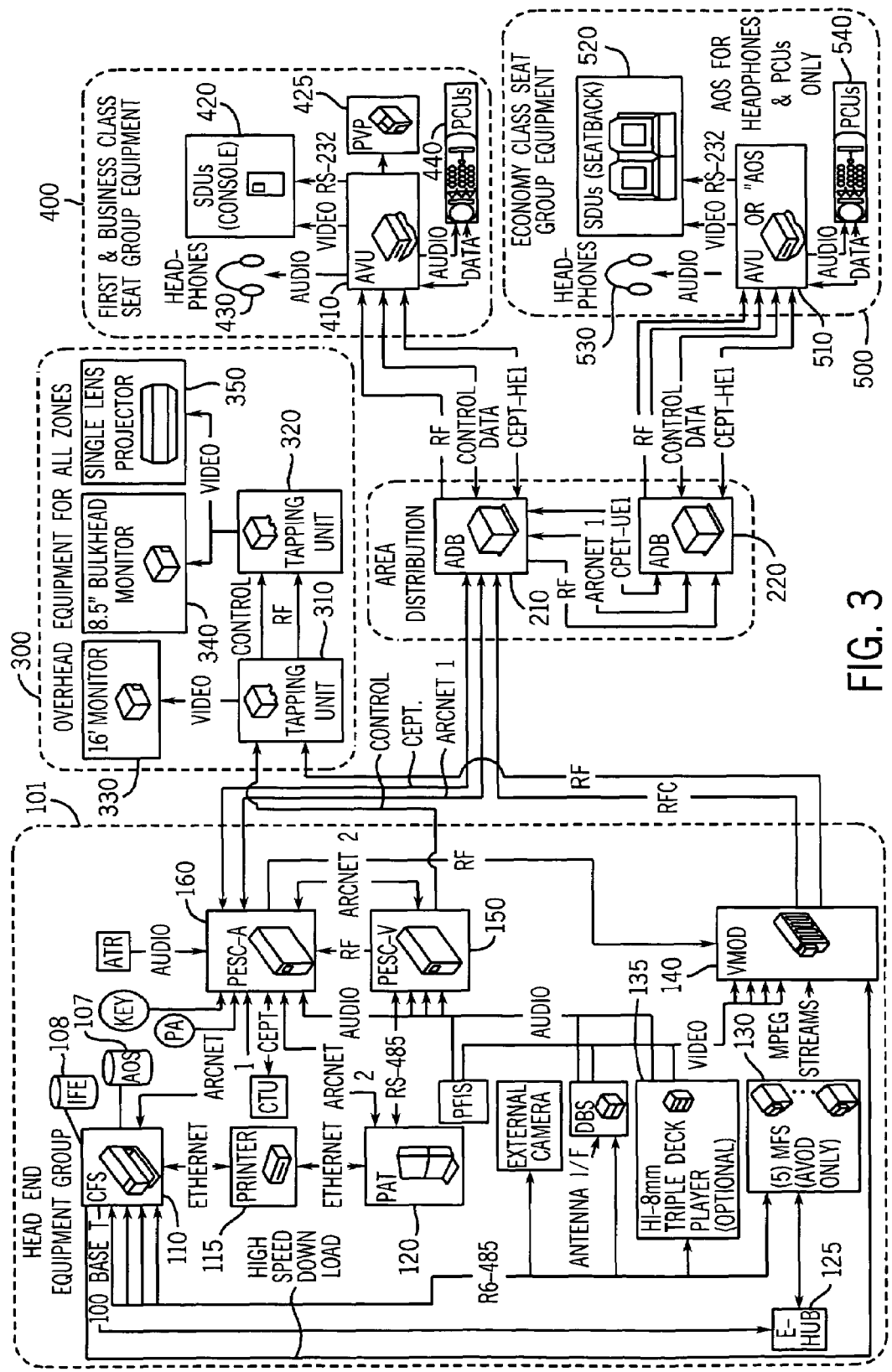
FIG. 3 illustrates selected components of the passenger entertainment system according to the invention.

FIG. 3 illustrates the CFS 110 and other selected hardware components of the passenger entertainment system according to the invention. The CFS 110 is shown as part of the head end equipment group 101. The head end equipment group 101 also includes a printer 115 and a primary access terminal 120 coupled to the CFS 110 by an ethernet connection. The primary access terminal 120 provides the operator interface (i.e., the crew GUI) to the passenger entertainment system. The CFS 110 is coupled to the MFS 130 through an ethernet hub (E-HUB) 125, by which Metadata (program information describing the media files stored on the MFS 130) is retrieved. The CFS 110 is shown connected to the ACS database 107 containing the aircraft configuration data and the IFE database 108 containing the entertainment database.

Under the control of the CFS 110 through an RS-485 bus, the MFS 130 generates a plurality of MPEG video streams. Up to five media file servers may be provided and each media file server, in the exemplary embodiment, has three outputs. Each media file server is equipped with a quadrature amplitude modulation circuit which is able to compress up to 15 MPEG video streams into each of its three outputs.

In parallel with the plural MPEG video streams, a video cassette player 135 supplies NTSC video streams to the video modulator 140. The video modulator 140 receives the NTSC video streams from the video cassette player 135, the plural MPEG video streams from the MFS 130, and other inputs, the details of which are provided in co-pending U.S. patent application Ser. No. 09/085,180, and produces a single RF output signal with multiple RF channels. The RF output signal is supplied to an overhead equipment group 300, and to a first and business class seat group 400 and an economy class seat group 500 via area distribution boxes (ADB) 210, 220.

Figure 4:
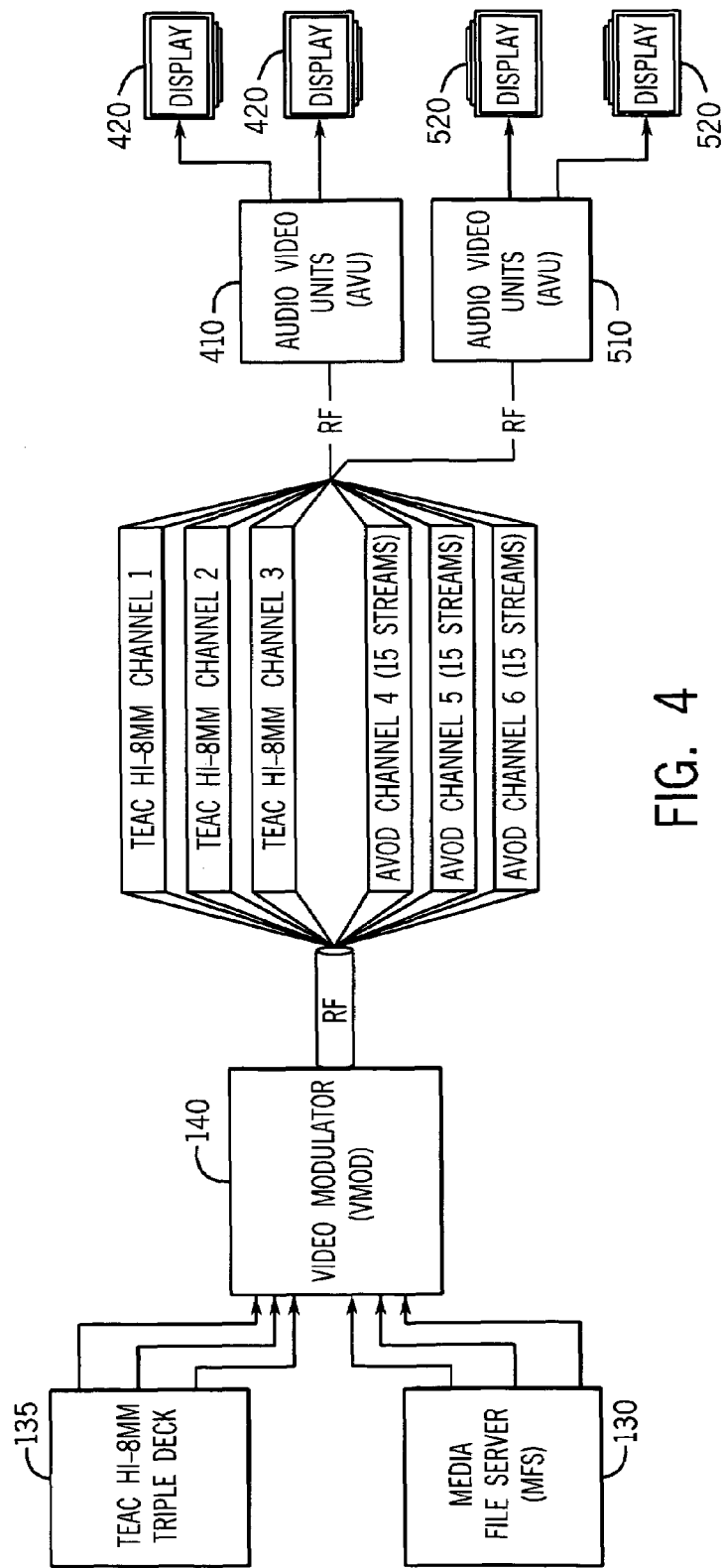
FIG. 4 illustrates programming signal paths in the passenger entertainment system according to the invention.

FIG. 4 illustrates the video modulator 140 receiving three sets of plural MPEG video streams from the MFS 130 and three NTSC video streams from the video cassette player 135, and producing a single RF output signal that carries all of the received signals in multiple RF channels. In the example shown, each one of RF channels 1-3 contains one of the three NTSC video streams from the video cassette player 135 and each one of RF channels 4-6 contains one of the three sets of plural (15) MPEG video streams from the MFS 130. The RF output signal is supplied to the ADB 210, 220 and to tapping units 310, 320 of the overhead equipment group 300, from which the RF output signal is distributed to an overhead monitor 330, or a bulkhead monitor 340 operated with a single lens projector 350.

Figure 5:
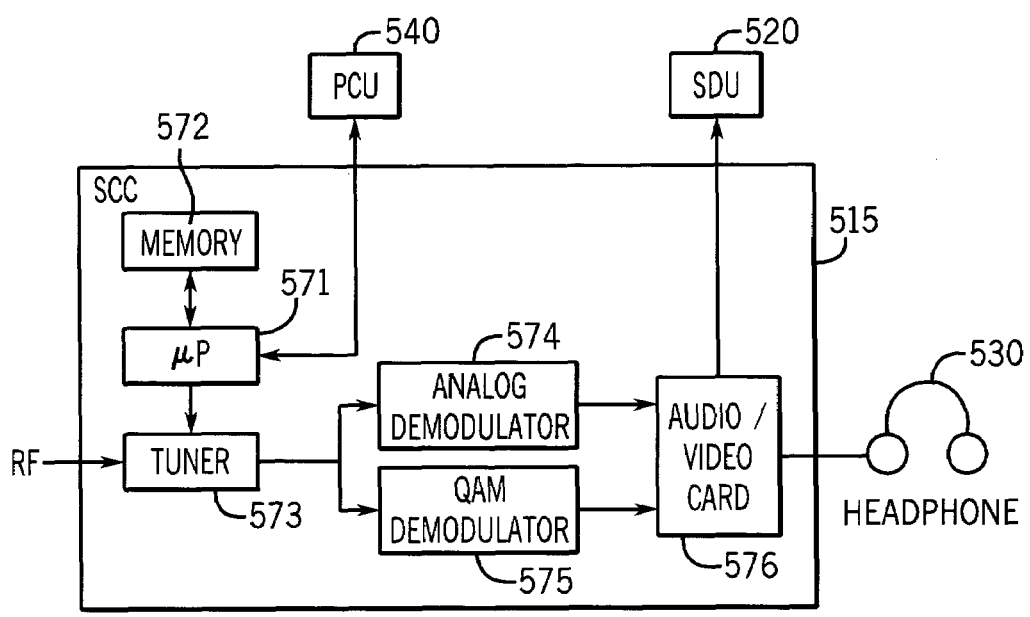
FIG. 5 is a block diagram of an exemplary seat controller card used in the passenger entertainment system according to the invention.

From the ADB 210, 220, the RF output signal is distributed to audio-visual units (AVUs) 410 of the first and business class section 400, and to audio-visual units (AVUs) 510 of the economy class section 500. Each one of AVU 410, 510 is provided for a set of two to three passenger seats and contains plural seat controller cards (SCCs), an exemplary one of which is shown in FIG. 5. An SCC is provided for each passenger seat, and each SCC controls a corresponding seat display unit (SDU) 420/520 and headphone 430/530, and is operated by a corresponding passenger control unit (PCU) 440/540.

The block diagram of a representative SCC 515 and its corresponding SDU 520, headphone 530 and PCU 540 are illustrated in FIG. 5. The SCC 515 includes a microprocessor 571, a memory 572, and a tuner 573 that is used to extract a signal from one of the RF channels of the multi-channel RF output signal. The selection of the RF channel is made using the PCU 540. The extracted signal is then demodulated using either an analog demodulator 574 or a QAM demodulator 575. An audio-video card 576 processes the demodulated signal and outputs video signals to the SDU 520 and audio signals to the headphone 530.

In the exemplary IFE system shown in FIG. 3, a 24-channel video modulator 140 is used and as a result, the RF output signal generated by the video modulator 140 and supplied to the passenger seat contains 24 RF channels. The number of program channels, however, is greater than 24, because multiple video streams, up to 15, may be carried on a single RF channel. In the IFE system according to the exemplary embodiment, 28 program channels (PCU channels 01-28) are carried on the RF channels, as shown in FIG. 6. In the exemplary embodiment shown in FIG. 6, the RF channels and the program channels are mapped independent of an equally-distributive relationship between the RF channels and program channels, i.e., the channels are not mapped based on a one-to-one, one-to-four, or other similar distributed or proportionate correspondence. Thus, for example, the system may be configured so that RF channel numbers 1-10 may each be assigned to one program channel, RF channel number 11 may be assigned to up to fifteen different program channels, RF channel 12-13 may be assigned to one program channel with up to fifteen video streams, and so on. Thus, the RF channels are mapped independent of an equally-distributive relationship between the RF channels and program channels. FIG. 6 also shows a column labeled "UPCU Channel." This column is provided for embodiments where a universal passenger control unit (UPCU) is used. The UPCU operates like a PCU except that its channel identifier includes 4 characters, both alpha and numeric.

Figure 7:
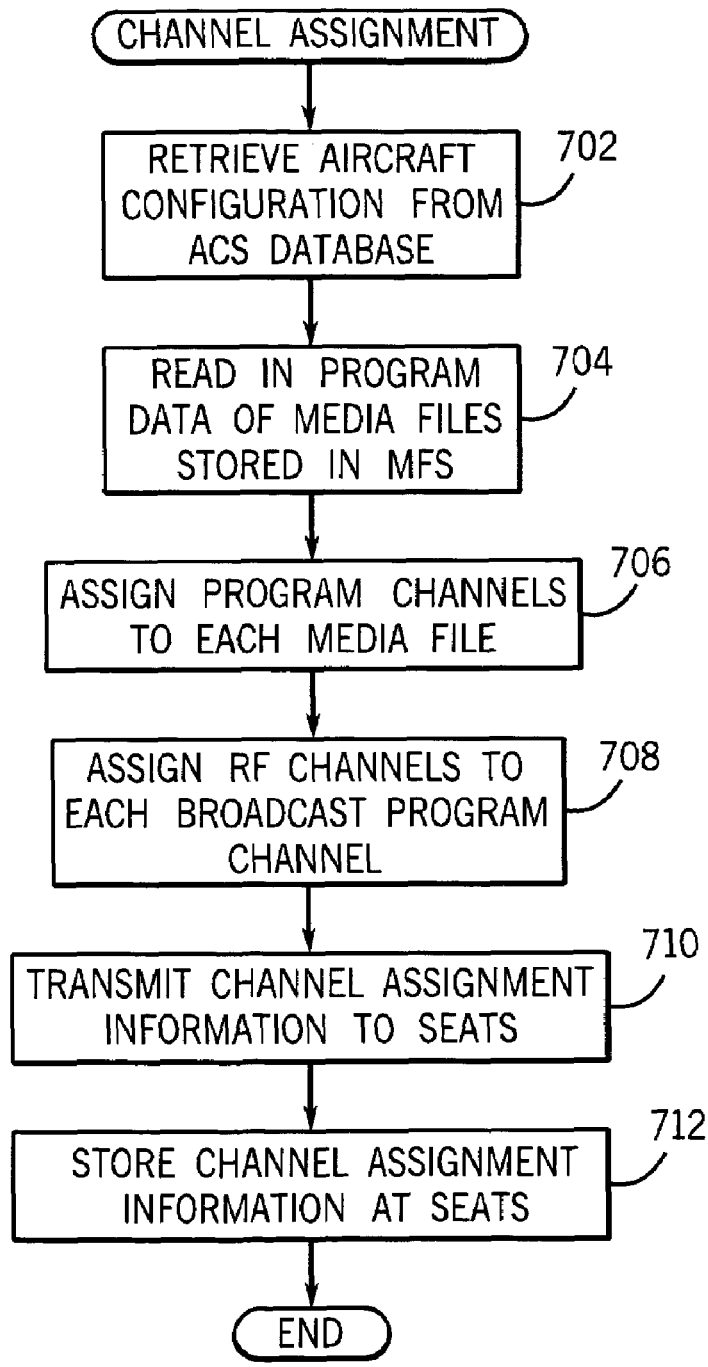
FIG. 7 is a flow diagram illustrating the program steps carried out by the system controller to transmit program information including channel assignment information to the passenger seats.

The program channel assignments are carried out by the CFS 110 executing the program steps set forth in FIG. 7. First, upon power-up of the IFE system, the CFS 110 accesses the ACS database 107 to retrieve data about the IFE system configuration, e.g., the number of media file servers, the number of video cassette players, and the number of RF channels that the video modulator 140 is configured for, and reads in program data corresponding to each of the media files stored in the MFS 130 (Steps 702 and 704) to determine the program channel assignment and the service type of the media files stored at the MFS 130.

Figure 8A:
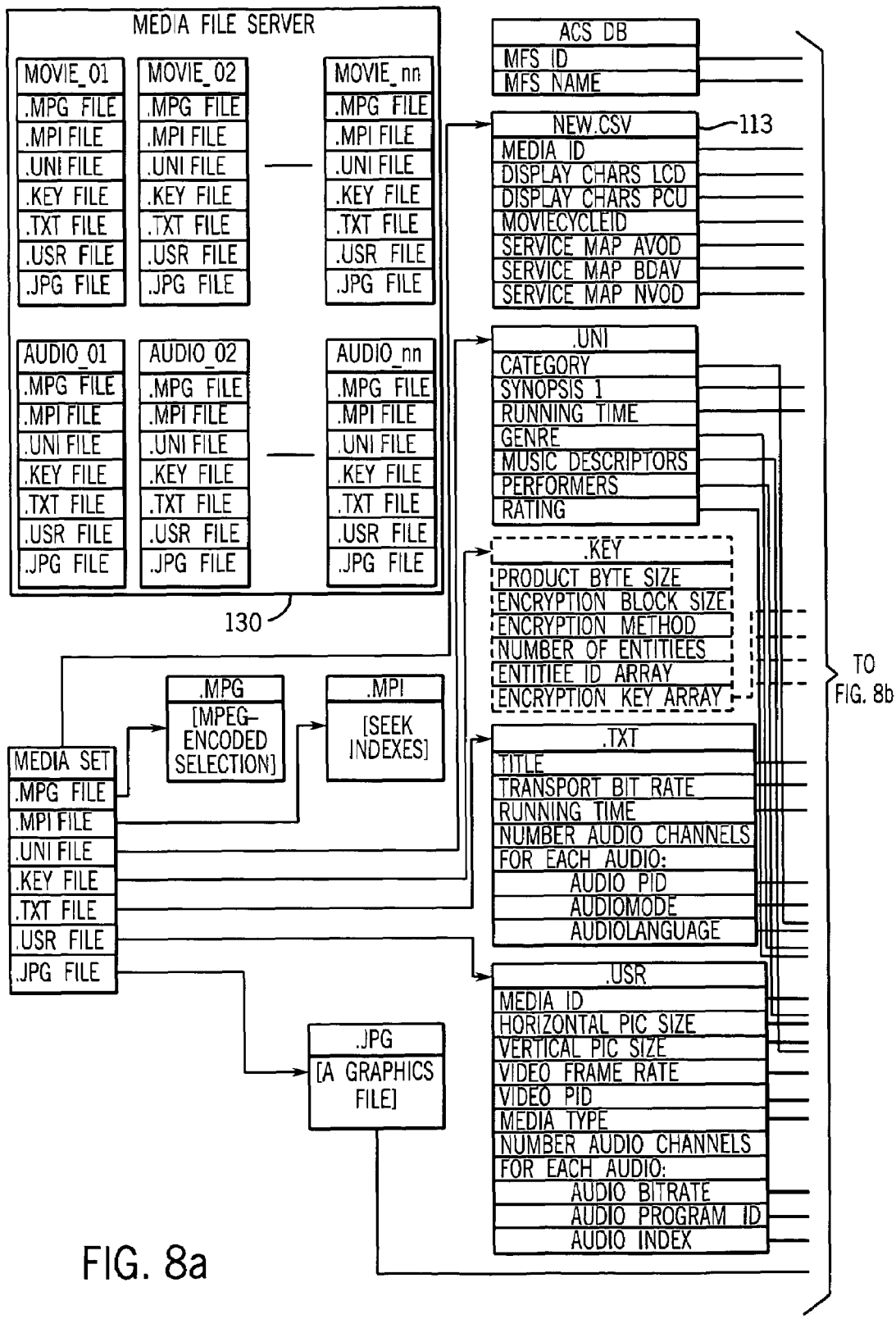
FIG. 8 illustrates the data structure of media files that are stored and used in the passenger entertainment system according to the invention.
Figure 8B:
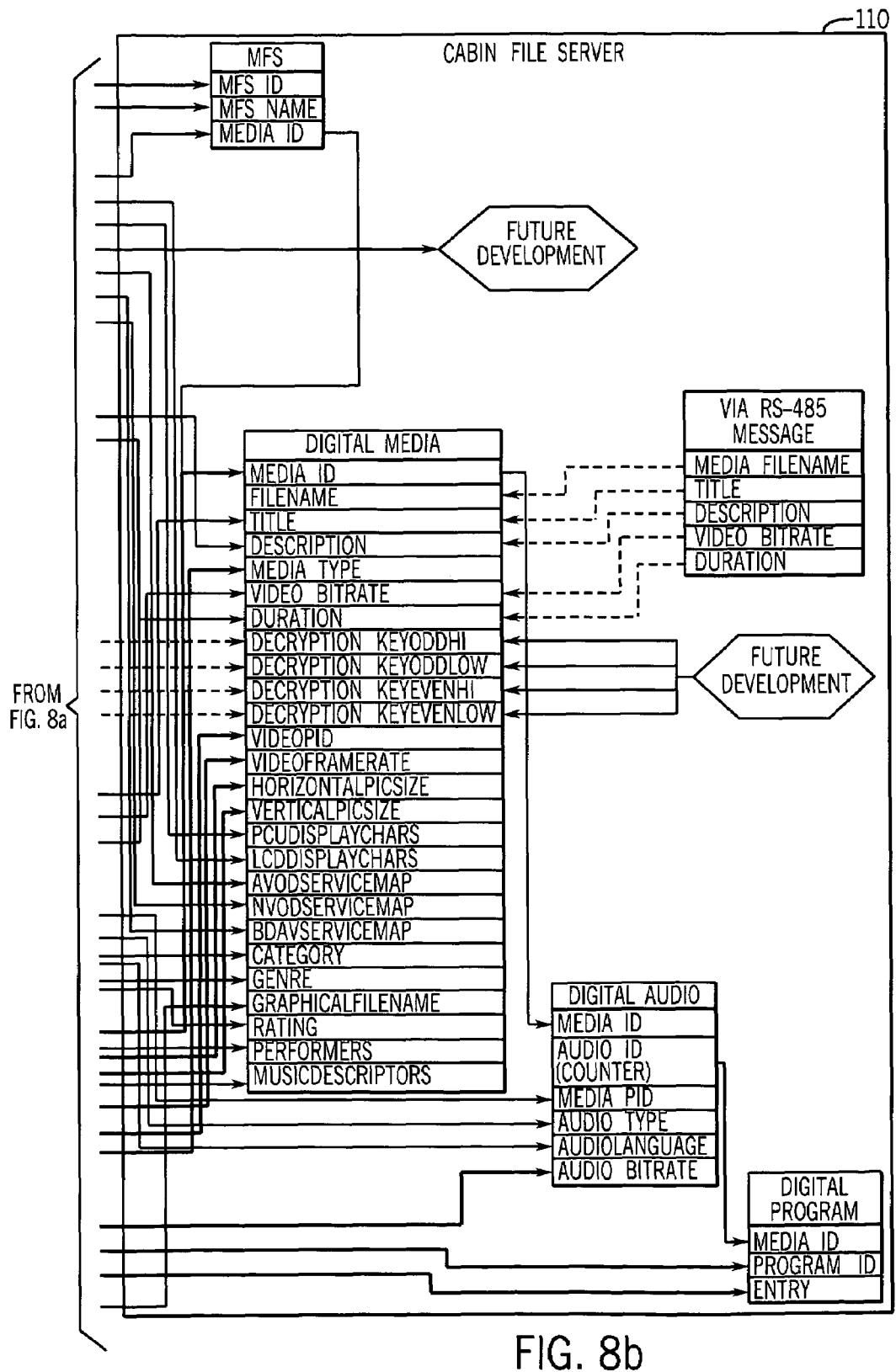

The contents of program data 113 for a typical media file is shown in FIG. 8. They include a media ID, display characters LCD, display characters PCU, movie cycle ID, service map AVOD, service map BDAV, and service map NVOD. The media ID is the file identifier or file name of this media file. Display characters LCD are characters, to be displayed at the SDU 520, corresponding to the program channel that has been pre-assigned to this media file. Display characters PCU are characters, to be displayed at the PCU 540, corresponding to the program channel that has been pre-assigned to this media file.

Instead of carrying the fields "display characters LCD" and "display characters PCU," the program data 113 may be configured to point to a table which is stored on the CFS and downloaded as part of the entertainment database to the seats. The characters that are to be displayed at the SDU 520 and the PCU 540 are stored at these table locations. This adds greater flexibility, so that both 2-character and 4-character PCUs may be used on a single aircraft and may be extended to work with analog video selections as well as the digital ones.

The movie cycle ID defines the start and stop times of the broadcasting of this media file so that the a common intermission can be set for all digital broadcasts. The service maps AVOD, BDAV, and NVOD are bits that are set to define whether this media file is enabled for audio/video-on-demand (AVOD), broadcast digital audio/video (BDAV), or near video-on-demand (NVOD). The display characters LCD and PCU, and the service map bits AVOD, BDAV, and NVOD are defined separately for each available class of service, so that, for example, a media file may be enabled for AVOD in the first and business class section and pre-assigned program channel 27, but enabled for BDAV in the economy class section and pre-assigned program channel 10.

For example, a media file for "Toy Story 2" containing the following program data:
  Media ID—D0001
  Display Characters LCD—27, 25, 10
  Display Characters PCU—27, 25, 10
  Movie Cycle ID—0, 0, 0
  Service Map AVOD—1, 0, 0
  Service Map BDAV—0, 0, 1
  Service Map NVOD—0, 1, 0 would have a file name of D0001 and the LCD/PCU channel assignment in First Class would be 27, in Business Class 25, and in Economy Class 10. Further, the movie cycle would be disabled in all three classes and the movie would be enabled for video-on-demand in First Class, for near video-on-demand in Business Class, and broadcast digital in Economy Class. The program data for all of the media files stored at the MFS 130 are interpreted and program channels are assigned to these media files by the CFS 110 in a similar manner (Step 706).

Subsequently, the CFS 110 assigns the 24 RF channels to the program channels (Step 708 of FIG. 7). The program channels 01-09 are assigned to analog video streams carried on RF channels 1, 2, 3, and 5-10. The program channels 10-24 which are to carry feature films #7-21, respectively, as designated by the program data for these media files, are assigned to RF channel 11 and its 15 streams. The program channel 25 which is to carry feature film #22 on a near video-on-demand basis, as designated by the program data for this media file, is assigned to RF channel 12 and its 15 video streams, and the program channel 26 which is to carry feature film #23 on a near video-on-demand basis, as designated by the program data for this media file, is assigned to RF channel 13 and its 15 video streams. The program channel 27 which is to carry video-on-demand movies is assigned to RF channels 14-22, and the program channel 28 which is to carry audio-on-demand selections is assigned to RF channels 23-24. The program channel assignment information is then stored at the IFE database and transmitted to the corresponding passenger seats (Step 710). At each passenger seat, the program channel assignment information is stored in the memory 572 of the corresponding SCC 515 (Step 712).

In the above example, the RF channel assignments were based on an IFE system having a 24-channel video modulator, 2 triple-deck video cassette players, and 5 media file servers, wherein each MFS has 3 RF outputs, each capable of delivering 27 Mbps of data or 15 independently controllable streams. With a different aircraft configuration, e.g., a 12-channel video modulator, one triple-deck video cassette player, and one media file server, the RF channel assignments would have been different. For example, the RF channels 8-10 would not have been assigned to program channels 07-09, because these program channels would be unused as only one video cassette player is employed in the IFE system. In place of program channel 07, the RF channel 8 would have been assigned to program channels 10-24, the RF channel 9 to program channel 25, and RF channel 10 to program channel 26. The remaining program channels would have been assigned to handle the video-on-demand and audio-on-demand selections. For this reason, upon power-up of the IFE system, the CFS 110 accesses the ACS database 107 and retrieves aircraft configuration data relating to the number of available RF channels, the number of media file servers, and the number of video cassette players, prior to the creation of the program channel assignment information.

Once the program channel assignment information is stored at the passenger seat, the passenger will be able to browse the available programs by title, view descriptive information about the programs, and select the programs by title. For example, given the program channel assignment of FIG. 6, the passenger may view feature films #1-83 by title. If the passenger selects feature film #1, the SCC 515 at his or her seat will tune to RF channel 5, and display feature film #1 on the SDU 520 and the program channel number 05 on the PCU 540 and/or the SDU 520. If the passenger selects feature film #22, the SCC 515 will tune to RF channel 12, select and display the video stream corresponding to the next showing of the feature film #22, and display the program channel number 25 on the PCU 540 and/or the SDU 520. If the passenger selects feature film #24, the CFS 110 will select any of RF channels 14-16 that has an available stream and command the MFS 130 (in particular, MFS2) to transmit the selected film over the available stream. Also, the SCC 515 will tune to the appropriate RF channel, extract the programming signals from the appropriate stream, show the feature film #24 on the SDU 520, and display the program channel number 27 (or DV) on the PCU 540 and/or the SDU 520.

In the exemplary embodiment, five media file servers are provided for feature films #1-83, and each feature film is uniquely allocated to one of the five media file servers. However, in alternative embodiments, the same film may appear on multiple media file servers to increase the number of passengers who can view the same titles.

The passenger is also able to control the showing of feature film #24 or any other video-on-demand feature film or any audio-on-demand selection. The available control functions using the PCU 540 are: Start, Stop, Pause, Jump Back and Jump Forward. The start function begins playback of the program from the current stream position. The pause function temporarily stops playback of the selected program. The passenger will be able to resume playback from the point the program was paused. The stop function stops the playback and exits the program. The passenger will not be able to resume playback from the point the program was stopped. The jump forward function moves forward through the program at a fixed increment of time. The jump backward function moves backward through the program at a fixed increment of time.

Alternatively, the passenger is able to channel surf, i.e., select programs by using the channel increase/decrease buttons on the PCU 540 or by operating the numeric keypad on the PCU 540. For example, if the current program channel indication is 10 and the passenger operates the channel increase button, the program channel indication changes to 11 and the feature film #8 is displayed on the SDU 520 instead of feature film #7. However, it should be noted that, in response to the channel increase operation, although the SCC 515 demodulates the stream corresponding to feature film #8, instead of the stream corresponding to feature film #7, the SCC 515 remains tuned to the same RF channel at 11.

If the current program channel indication is 10 and the passenger operates the numeric keypad to enter 25, a near video-on-demand selection, the SCC 515 will tune to the RF channel corresponding to the program channel 25, i.e., RF channel 12, and display the stream corresponding to the next showing of the feature film #22 on the SDU 520. Also, the program channel number 25 will be displayed on the PCU 540 and/or the SDU 520.

Figure 9:
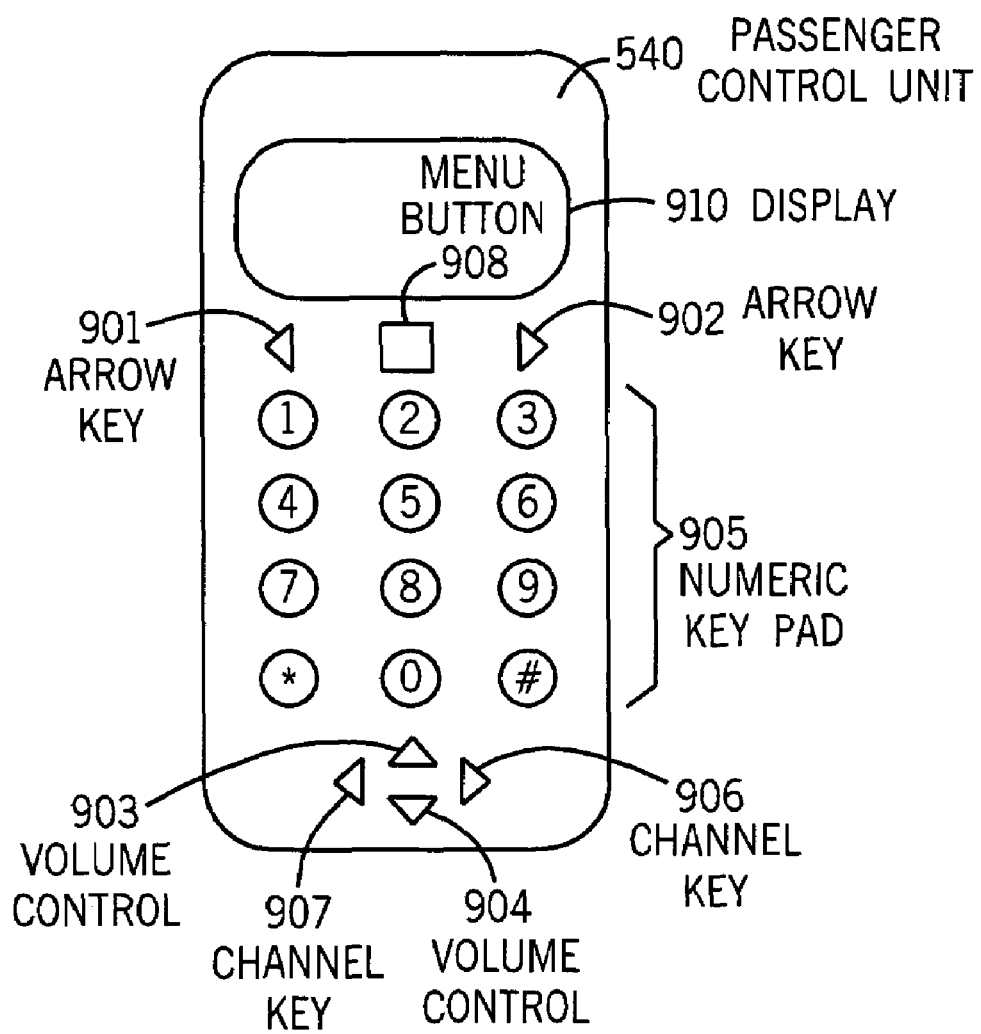
FIG. 9 illustrates a typical passenger input device by which the passenger makes programming selections.

FIG. 9 is a more detailed illustration of the PCU 540 that is used to make program channel selections. Alternatively to the PCU 540, a universal PCU or a touch panel may be provided. The functions available through the PCU includes menu navigation using arrow keys 901, 902, volume control with volume +/− keys 903, 904, program channel selection with numeric keypad 905 or channel +/− keys 906, 907, and a menu button 908 for selection of functions such as start, pause, stop, jump forward, and jump back. The PCU also has a display 910, capable of showing 2 or more characters representing 01-99, to display channel selections, or a 4-character display as with the UPCU, capable of showing channels 0001-9999 as well as alphanumerics.

While particular embodiments according to the invention have been illustrated and described above, it will be clear that the invention can take a variety of forms and embodiments within the scope of the appended claims.

I claim:

1. A method for providing video to a passenger seat display of an aircraft, the passenger seat display communicably coupled to a seat controller unit located in close proximity to the passenger seat display and a passenger control unit, the method comprising:
   identifying digital media files stored in a digital media file server on the aircraft;
   reading the digital media files and program data of the digital media files to identify viewable programs;
   generating an entry of channel assignment information in a programming database for each identified viewable program;
   updating the programming database to assign a passenger control unit channel to each of the identified viewable programs;
   updating the programming database to assign at least one RF channel to each of the passenger control unit channels;
   receiving an input signal from the passenger control unit at the seat controller unit, the input signal representing a request to play back a selected viewable program of the identified viewable programs; and
   using the seat controller unit and program channel assignment information of the programming database to:
      tune the seat controller unit to a proper RF channel for receiving the selected viewable program; and
      causing an identifier of the passenger control unit channel to be displayed.

2. The method of claim 1, further comprising:
   sending the program channel assignment information to memory in the seat controller unit, the program channel assignment information including the assignments of identified viewable programs to passenger control unit channels and the assignments of RF channels to passenger control unit channels.

3. The method of claim 1, further comprising:
   receiving a second input signal from the passenger control unit at the seat controller unit, the second input signal representing a request to increment the passenger control unit channel; and
   using the seat controller unit and the program channel information to determine whether to change RF channels based on the second input signal.

4. The method of claim 3, further comprising:
   incrementing the identifier of the passenger control unit channel.

5. The method of claim 4, wherein the identifier is displayed on the passenger control unit.

6. The method of claim 4, wherein the RF-channel is not changed although the identifier of the passenger control unit channel is incremented.

7. The method of claim 1, further comprising:
   requesting a new stream containing the selected viewable program to be provided on an further channel associated with the selected viewable program.

8. The method claim 1, further comprising:
   modulating the selected viewable program and another viewable program onto the RF channel associated with the selected viewable program; and
   using the seat controller unit to demodulate the selected viewable program from the RF channel associated with the selected viewable program.

9. The method of claim 2, further comprising:
receiving an input signal from the passenger control unit at the seat controller unit to change to a particular passenger control unit channel identifier;
using the seat controller unit to determine whether to tune to a different RF channel based on the program channel assignment information stored in the memory of the seat controller unit.

10. The method of claim 9, further comprising:
using the seat controller unit to determine whether to tune to a particular stream of the RF channel or the different RF channel based on the program channel assignment information stored in the memory of the seat controller unit; and
updating the identifier of the passenger control unit channel and causing the passenger control unit to display the updated identifier of the passenger control unit channel;
wherein an identifier of RF channel does not match the identifier of the passenger control unit channel.

11. A system for providing video to a passenger seat display of an aircraft, the passenger seat display communicably coupled to a seat controller unit located in close proximity to the passenger seat display and a passenger control unit having a display, the system comprising:
computer memory for storing digital media files, the digital media files including program data;
a server configured to read the digital media files and program data to identify viewable programs, wherein the server is further configured to generate an entry of channel assignment information in a programming database for each identified viewable program, wherein the server is further configured to update the programming database to assign a passenger control unit channel to each of the identified viewable programs, wherein the server is further configured to update the programming database to assign at least one RF channel to each of the passenger control unit channels in the programming database;
wherein the seat control unit comprises an interface for receiving an input signal from the passenger control unit at the seat controller unit, the input signal representing a request to play back a selected viewable program of the identified viewable programs;
wherein the seat controller unit is configured to use the programming assignment information of the programming database to tune the seat controller unit to a proper RF channel for receiving the selected viewable program and to cause an identifier of the passenger control unit channel to be displayed via one of the passenger seat display and the passenger control unit display.

12. The system of claim 11, wherein the server is further configured to send the program channel assignment information to memory in the seat controller unit, the program channel assignment information including the assignments of identified viewable programs to passenger control unit channels and the assignments of RF channels to passenger control unit channels.

13. The system of claim 11, wherein the seat controller unit is configured to receive a second input signal from the passenger control unit, the second input signal representing a request to increment the passenger control unit channel; and
wherein the seat controller unit is configured to determine whether to change RF channels based on the second input signal.

14. The system of claim 13, wherein the passenger control unit is configured to increment the identifier of the passenger control unit channel.

15. The system of claim 14, wherein the identifier is displayed on the passenger control unit.

16. The system of claim 14, wherein the seat controller unit is configured to remain tuned to an RF-channel although the identifier of the passenger control unit channel is incremented.

17. The system of claim 11, wherein the seat controller unit is configured to request a new stream containing the selected viewable program to be provided on an RF channel associated with the selected viewable program.

18. The system claim 11, wherein the server is coupled to a device configured to modulate the selected viewable program and another viewable program onto the RF channel associated with the selected viewable program; and
wherein the seat controller unit is configured to demodulate the selected viewable program from the RF channel associated with the selected viewable program.

19. The system of claim 12, wherein the seat controller unit is configured to determine whether to tune to a different RF channel based on the program channel assignment information stored in the memory of the seat controller unit after receiving an input signal from the passenger control unit to change to a particular passenger control unit channel identifier.

20. The system of claim 19, wherein the seat controller unit is configured to determine whether to tune to a particular stream of the RF channel or the different RF channel based on the program channel assignment information stored in the memory of the seat controller unit, and wherein the seat controller unit is further configured to update and cause the passenger control unit to display the identifier of the passenger control unit channel, and wherein an identifier of RF channel does not match the identifier of the passenger control unit channel.

* * * * *